April 19, 1932.        J. W. BAIRD        1,854,442
SHOCK ABSORBER

Filed Jan. 3, 1928

Inventor
John W. Baird
by Frank J. Schraeder Jr.
Attorney.

Patented Apr. 19, 1932

1,854,442

UNITED STATES PATENT OFFICE

JOHN W. BAIRD, OF GLEN ELLYN, ILLINOIS

SHOCK ABSORBER

Application filed January 3, 1928. Serial No. 244,103.

This invention relates generally to shock absorbers for vehicle springs and the like and has particular reference to a new and improved auxiliary rebound control for vehicle springs which shall be simple in construction and readily adaptable for attachment to existing types of leaf springs.

One of the objects of my invention is to provide a readily attachable shock absorber which shall permit the flexing of a leaf spring in one direction but which shall resist the bending action of such spring when it is flexed in the opposite direction.

Another object of my invention is to provide a shock absorber which comprises a single resisting member, a comparatively short securing shackle and adjustable means for varying the resistance of the resisting member.

A further object of my invention is found in the provision of an elongated resisting member adapted to be attached to an elliptical spring and constituting a pair of lever arms arranged to resist the flexing of the spring ends in one direction.

A still further object of my invention is found in the embodiment of such elongated resisting member extending substantially the entire length of the elliptical spring and provided with means near its ends for adjustably varying the resistance of such member.

With the above and other objects in view, the invention consists in the novel combination, construction and arrangement of the parts and members shown the preferred embodiments in the accompanying drawings, described in the following specifications and particularly pointed out in the appended claims.

Referring to the drawings:—

Figure 4:
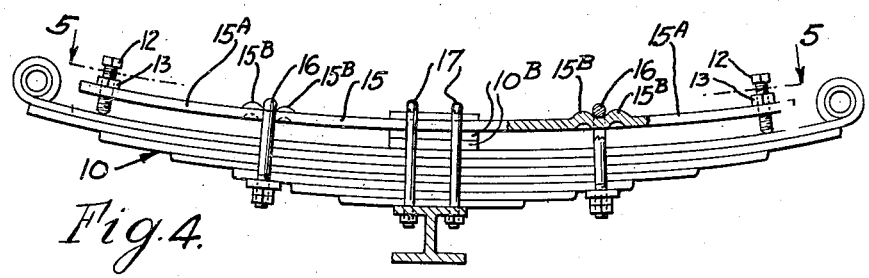

Fig. 4 is a side elevation of a modified form of my invention wherein the resisting member for both ends of the elliptical spring constitutes a single plate having supporting means and adjustable means for varying its resistance; the resisting plate itself being partly in section to show the supporting means which limit its longitudinal and transverse movement but permit a vertical movement of its end portions.

Figure 5:
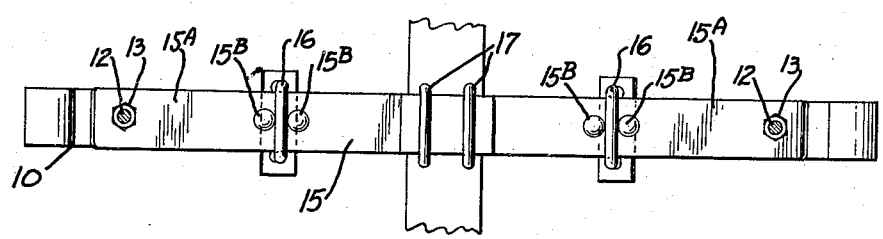

Fig. 5 is a section plan view taken on line 5—5 of Fig. 4.

Figure 1:
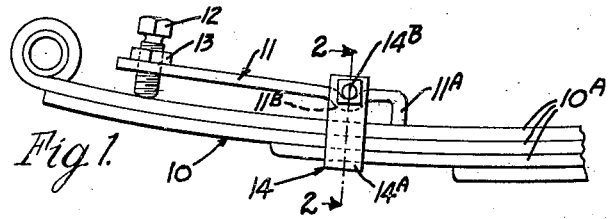
Fig. 1 is a side elevation of a rebound control or shock absorber embodying my invention as applied near one end of an elliptical spring, the spring being only partly shown in this illustration.
Figure 2:
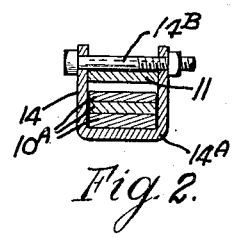
Fig. 2 is a cross section taken on line 2—2 of Fig. 1.
Figure 3:
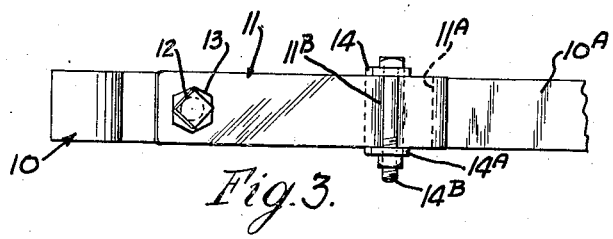
Fig. 3 is a plan view of the shock absorber shown in Fig. 1.

Referring now to Figs. 1, 2, and 3, the end portion of an elliptical vehicle spring is designated by numeral 10. The resisting member 11 comprises a flat bar or plate of suitable thickness and preferably of a width equal to the width of the leaves 10$^A$ of the spring 10.

The resisting member is formed with the inner end 11$^A$ bent right-angularly for engagement with the upper leaf 10$^A$. The other end of the member 11 is provided with a set screw 12 and a lock nut 13. The lower end of the set screw 12 also engages upon the upper leaf spring 10$^A$. A shackle 14 is provided for retaining the resisting member 11 against longitudinal and transverse movement and comprises a U-shaped bar 14$^A$ and bolt 14$^B$.

The portion of the member 11 beneath the bolt 14$^B$ is bent as at 11$^B$ to form a cross channel for the bolt 14$^B$ to prevent longitudinal movement of the member 11 relatively to the shackle 14.

It will now be readily apparent that the bolt 14$^B$ forms a fulcrum for the lever 11 and also that the further the screw 12 is screwed into the end of the member 11 the greater will be the resistance of the lever member 11 against the end of the spring 10. It will also be noted that when the spring 10, is compressed no resistance will be interposed upon the spring 10 by the member 11 at the end of the screw 12 but as the spring 10 is flexed in the reverse direction in the rebound or recoil, the end of the spring 10 will be resisted by engagement with the screw 12 and will cause an upward pressure against the shackle bolt 14^B which will be transmitted to the end 11^A. Thus the ends of elliptical springs may be stiffened to resist rebound or recoil.

In the modification shown in Figs. 4 and 5, the elliptical spring 10 is shown in full elevation in Fig. 4, and the resisting member 15 in this case is elongated or extended under the U-bolts 17 over substantially the full length of the spring 10. The member 15 comprises a flat bar having a slight arcuate formation which is held in spaced relation to the spring 10 by means of the filler plate 10^B and set screws 12.

Suitable U-bolt shackles 16 are provided which produce comparatively short resisting arms 15^A at the ends of the member 15 and which prevent longitudinal and transverse movement of the member 15 relatively to the spring 10. The upper surface of the member 15, on both sides of the horizontal portion of the U-bolt 16, is deformed or slightly raised by punching operation to form the raised portions 15^B.

The pressure or resistance of the adjustable set screws 12 in the rebound action of the spring 10 is in this instance resisted by the shackles 16. The action of this type of rebound or recoil absorber is of course similar to that above described and illustrated in Figs. 1, 2 and 3.

I claim:

1. In a device of the kind described, the combination with a leaf spring, of means adapted to resist the flexing of said leaf spring in one direction, said means comprising a comparatively short lever bar having one end bent right-angularly and in engagement with said spring, an adjustable member carried at the other end of said lever bar, said member being in engagement with said spring, and a support for said lever bar resisting the movement of said lever bar longitudinally and transversely relatively to said spring, said lever being spaced from the anchored intermediate portion of said spring and positioned on the vibrating end of said spring with both ends of said lever confined in the path of flexure of said spring.

2. A shock absorber comprising a short stiff spring metal plate contacting one free end portion of a vehicle spring at a position longitudinally spaced from the anchored intermediate portion of the latter, one end of said plate being bent to contact with a leaf of the spring, a tensioning screw passing through the other end of said plate for adjusting the tension thereof, and a clamp to extend jointly around said free end portion of the spring and an intermediate portion of said plate, said clamp embodying a transverse portion upon which said intermediate portion of said plate rests, said plate having a transverse groove rockably receiving said transverse clamp portion, said clamp being provided with another transverse portion adapted to engage the opposite side of said spring.

In witness whereof I affix my signature.
JOHN W. BAIRD.